(12) United States Patent
Saravanan et al.

(10) Patent No.: US 11,676,386 B2
(45) Date of Patent: Jun. 13, 2023

(54) METHOD AND SYSTEM FOR AUTOMATED ANALYSIS OF HUMAN BEHAVIOR UTILIZING VIDEO DATA

(71) Applicant: Signzy Technologies Private Limited, Mumbai (IN)

(72) Inventors: Aadalarasan Bhavani Saravanan, Mumbai (IN); Christen Miller, Mumbai (IN); Ryan Dsouza, Mumbai (IN); Chitrangada Patra, Mumbai (IN); Dinesh Avula, Mumbai (IN); Ankit Ratan, Mumbai (IN); Arpit Ratan, Mumbai (IN); Ankur Pandey, Mumbai (IN)

(73) Assignee: Signzy Technologies Private Limited, Mumbai (IN)

( * ) Notice: Subject to any disclaimer, the term of this patent is extended or adjusted under 35 U.S.C. 154(b) by 255 days.

(21) Appl. No.: 17/125,983

(22) Filed: Dec. 17, 2020

(65) Prior Publication Data

US 2022/0027635 A1  Jan. 27, 2022

(51) Int. Cl.
*G06V 20/00* (2022.01)
*G06V 20/52* (2022.01)
*G06N 20/00* (2019.01)
*H04N 7/18* (2006.01)
*G06V 40/20* (2022.01)

(52) U.S. Cl.
CPC ............ *G06V 20/52* (2022.01); *G06N 20/00* (2019.01); *G06V 40/20* (2022.01); *H04N 7/181* (2013.01)

(58) Field of Classification Search
CPC ........ G06N 20/00; G06N 3/08; G06V 10/774; G06V 40/20; G06K 9/00771
See application file for complete search history.

(56) References Cited

U.S. PATENT DOCUMENTS

| 7,908,233 | B2 * | 3/2011 | Angell | G06N 3/004 |
| | | | | 706/45 |
| 10,395,262 | B2 * | 8/2019 | Faith | G06Q 50/01 |
| 2020/0221054 | A1 * | 7/2020 | Carey | G06V 40/23 |
| 2020/0279279 | A1 * | 9/2020 | Chaudhuri | G10L 25/63 |

* cited by examiner

*Primary Examiner* — Pakee Fang
(74) *Attorney, Agent, or Firm* — Kolisch Hartwell, P.C.

(57) ABSTRACT

The present disclosure provides a method and system for automated analysis of human behavior. The automated analysis of human behavior is performed to determine fraudulent behavior. The system collects a technical data and a video data from one or more data sources and one or more video sources. In addition, the system trains a fraudulent behavior detection system with the collected technical data and the video data in real-time. Further, the system receives a live video stream data from the one or more video sources. Furthermore, the system analyzes the live video stream data received from the one or more video sources installed at the facility in real-time. Moreover, the system predicts likelihood of fraudulent behavior of humans based on analyzation of the live video stream data. Also, the system performs prediction to alarm concerned authorities of the facility about likelihood of fraudulent behavior.

14 Claims, 4 Drawing Sheets

METHOD AND SYSTEM FOR AUTOMATED ANALYSIS OF HUMAN BEHAVIOR UTILIZING VIDEO DATA

TECHNICAL FIELD

The present disclosure relates to the field of behavior analysis, and in particular, relates to a method and system for automated analysis of human behavior.

INTRODUCTION

Financial institutions and supermarkets continuously strive hard to provide enhanced productivity and security to their customers. Many a times, financial institutions and supermarkets fall prey to security breaches such as theft and frauds. Such security breaches leads to large amount of monetary losses and defamation of the financial institutions and supermarkets. Conventionally, financial institutions and supermarkets are equipped with surveillance cameras and security guards. The surveillance cameras are used to capture images and record videos for subsequent or contemporaneous analysis. However, involving human beings for manual analysis is often time consuming. In addition, involving human beings for manual analysis proves out to be inefficient.

In light of the above stated discussion, there exists a need of an automated system for fraud detection to overcome the above stated disadvantages.

SUMMARY

In a first example, a computer-implemented method is provided. The computer-implemented method performs automated analysis of human behavior. The automated analysis of human behavior is performed to determine fraudulent behavior. The computer-implemented method includes a first step to collect a technical data and a video data from one or more data sources and one or more video sources at a fraudulent behavior detection system with a processor. The computer-implemented method includes another step to train the fraudulent behavior detection system with the collected technical data and the video data in real-time at the fraudulent behavior detection system with the processor. The computer-implemented method includes another step to receive a live video stream data from the one or more video sources at the fraudulent behavior detection system with the processor. The computer-implemented method includes another step to analyze the live video stream data received from the one or more video sources installed at a facility in real-time at the fraudulent behavior detection system with the processor. The computer-implemented method includes another step to predict likelihood of fraudulent behavior of humans based on analyzation of the live video stream data at the fraudulent behavior detection system with the processor. The one or more data sources and the one or more video sources are associated with the fraudulent behavior detection system. The fraudulent behavior detection system facilitates training in real-time. The training of the fraudulent behavior detection system is performed using one or more hardware-run machine learning algorithms and one or more hardware-run deep learning algorithms. The live video stream data is received continuously in real-time. The one or more video sources are installed at the facility. The live video stream data is analyzed using one or more hardware-run machine learning algorithms and one or more hardware-run deep learning algorithms. The prediction is performed to alarm concerned authorities of the facility about likelihood of fraudulent behavior.

In an embodiment of the present disclosure, the technical data includes employee data, real-time transaction data, design engineer input, movement calculation of human, and architecture of the facility.

In an embodiment of the present disclosure, the video data includes voice communication between humans, facial expression of humans, and body movement pattern of humans.

In an embodiment of the present disclosure, the one or more data sources include at least one of online databases, offline databases, data warehouses, websites, web pages and live CCTV feed.

In an embodiment of the present disclosure, the one or more video sources include one or more cameras. The one or more cameras include at least one of infrared cameras, surveillance cameras, and CCTV cameras.

In an embodiment of the present disclosure, the facility includes at least one of banks, financial institutions, depository institutions, non-depository institutions, malls, and departmental stores.

In an embodiment of the present disclosure, the technical data is collected in one or more input formats. The one or more formats include at least one of text, audio, video, animation, and gif.

In an embodiment of the present disclosure, the fraudulent behavior detection system scans the live video stream data. The scanning of the live video stream data is performed to divide the live video stream data into one or more frames of images. The frames of images are properly analyzed to predict likelihood of fraudulent behavior.

In an embodiment of the present disclosure, the fraudulent behavior detection system maps moving pattern of humans from the live video stream data to moving pattern of fraudsters in the video data. The mapping is performed to identify fraudsters from humans in the live video stream data.

In a second example, a computer system is provided. The computer system includes one or more processors, and a memory. The memory is coupled to the one or more processors. The memory stores instructions. The memory is executed by the one or more processors. The execution of the memory causes the one or more processors to perform automated analysis of human behavior. The automated analysis of human behavior is performed to determine fraudulent behavior. The computer system includes a first step to collect a technical data and a video data from one or more data sources and one or more video sources at a fraudulent behavior detection system. The computer system includes another step to train the fraudulent behavior detection system with the collected technical data and the video data in real-time at the fraudulent behavior detection system. The computer system includes another step to receive a live video stream data from the one or more video sources at the fraudulent behavior detection system. The computer system includes another step to analyze the live video stream data received from the one or more video sources installed at a facility in real-time at the fraudulent behavior detection system. The computer system includes another step to predict likelihood of fraudulent behavior of humans based on analyzation of the live video stream data at the fraudulent behavior detection system. The one or more data sources and the one or more video sources are associated with the fraudulent behavior detection system. The fraudulent behavior detection system facilitates training in real-time. The training of the fraudulent behavior detection system is performed using one or more hardware-run machine learning algorithms and one or more hardware-run deep learning algorithms. The live video stream data is received continuously in real-time. The one or more video sources are installed at the facility. The live video stream data is analyzed using one or more hardware-run machine learning algorithms and one or more hardware-run deep learning algorithms. The prediction is performed to alarm concerned authorities of the facility about likelihood of fraudulent behavior.

In an embodiment of the present disclosure, the technical data includes employee data, real-time transaction data, design engineer input, movement calculation of human, and architecture of the facility.

In an embodiment of the present disclosure, the video data includes voice communication between humans, facial expression of humans, and body movement pattern of humans.

In an embodiment of the present disclosure, the one or more video sources include one or more cameras. The one or more cameras include at least one of infrared cameras, surveillance cameras, and CCTV cameras.

In an embodiment of the present disclosure, the facility includes at least one of banks, financial institutions, depository institutions, non-depository institutions, malls, and departmental stores.

In an embodiment of the present disclosure, the fraudulent behavior detection system scans the live video stream data. The scanning of the live video stream data is performed to divide the live video stream data into one or more frames of images. The frames of images are properly analyzed to predict likelihood of fraudulent behavior.

In an embodiment of the present disclosure, the fraudulent behavior detection system maps moving pattern of humans from the live video stream data to moving pattern of fraudsters in the video data. The mapping is performed to identify fraudsters from humans in the live video stream data.

In a third example, a non-transitory computer-readable storage medium is provided. The non-transitory computer-readable storage medium encodes computer executable instructions that, when executed by at least one processor, performs a method. The method performs automated analysis of human behavior. The automated analysis of human behavior is performed to determine fraudulent behavior. The non-transitory computer-readable storage medium includes a first step to collect a technical data and a video data from the one or more data sources and one or more video sources at a computing device. The non-transitory computer-readable storage medium includes another step to train a fraudulent behavior detection system with the collected technical data and the video data in real-time at the computing device. The non-transitory computer-readable storage medium includes another step to receive a live video stream data from the one or more video sources at the computing device. The non-transitory computer-readable storage medium includes another step to analyze the live video stream data received from the one or more video sources installed at a facility in real-time at the computing device. The non-transitory computer-readable storage medium includes another step to predict likelihood of fraudulent behavior of humans based on analyzation of the live video stream data at the computing device. The one or more data sources and the one or more video sources are associated with the fraudulent behavior detection system. The fraudulent behavior detection system facilitates training in real-time. The training of the fraudulent behavior detection system is performed using one or more hardware-run machine learning algorithms and one or more hardware-run deep learning algorithms. The live video stream data is received continuously in real-time. The one or more video sources are installed at the facility. The live video stream data is analyzed using one or more hardware-run machine learning algorithms and one or more hardware-run deep learning algorithms. The prediction is performed to alarm concerned authorities of the facility about likelihood of fraudulent behavior.

In an embodiment of the present disclosure, the one or more video sources include one or more cameras. The one or more cameras include at least one of infrared cameras, surveillance cameras, and CCTV cameras.

In an embodiment of the present disclosure, the fraudulent behavior detection system scans the live video stream data. The scanning of the live video stream data is performed to divide the live video stream data into one or more frames of images. The frames of images are properly analyzed to predict likelihood of fraudulent behavior.

In an embodiment of the present disclosure, the fraudulent behavior detection system maps moving pattern of humans from the live video stream data to moving pattern of fraudsters in the video data. The mapping is performed to identify fraudsters from humans in the live video stream data.

BRIEF DESCRIPTION OF DRAWINGS

Having thus described the invention in general terms, references will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
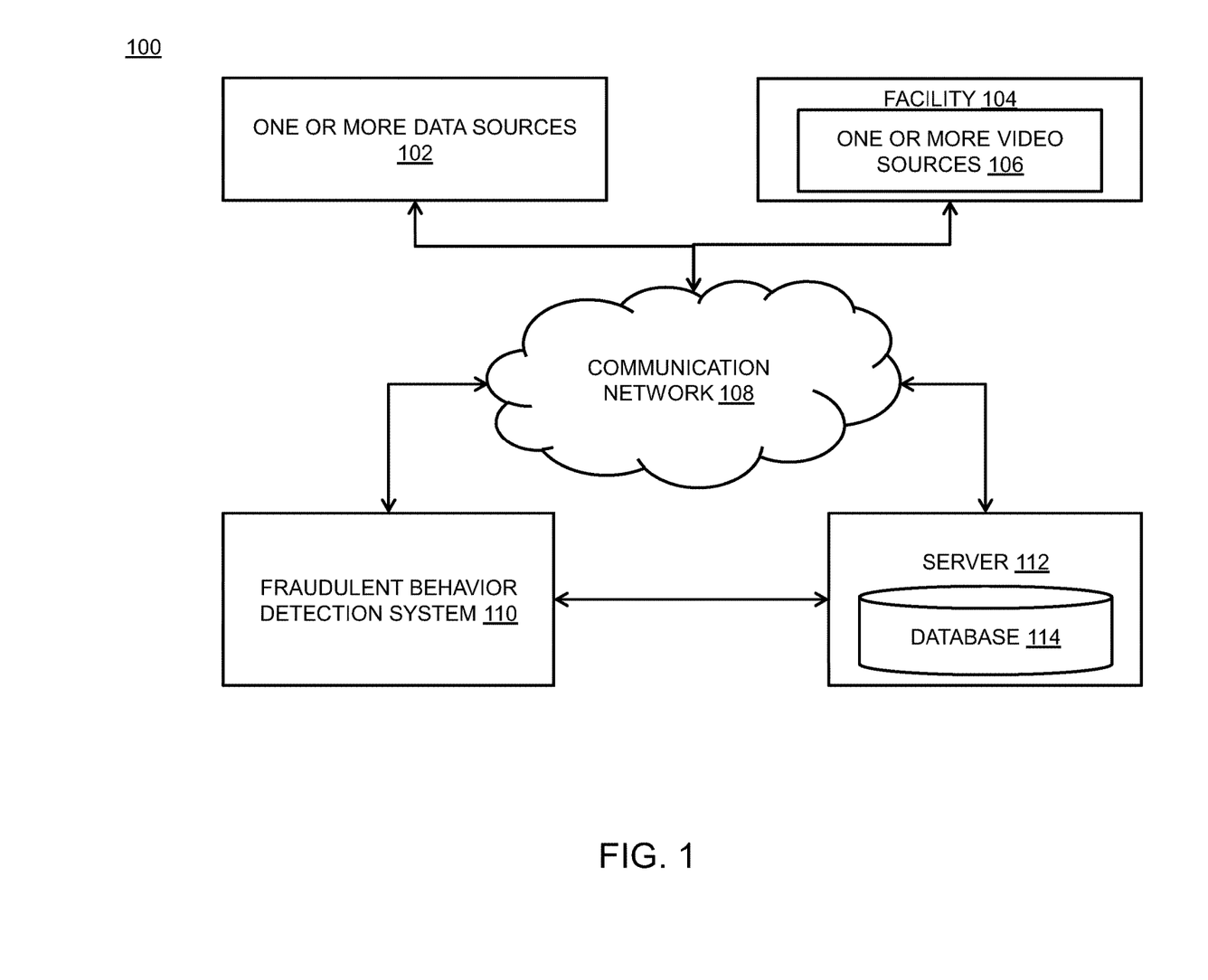
FIG. 1 illustrates a general overview of an interactive computing environment for automated analysis of human behavior, in accordance with various embodiments of the present disclosure.

FIG. 1 illustrates a general overview of an interactive computing environment 100 for automated analysis of human behavior, in accordance with various embodiments of the present disclosure. The interactive computing environment 100 includes one or more data sources 102, a facility 104, one or more video sources 106, a communication network 108, a fraudulent behavior detection system 110, a server 112, and a database 114. The components of the interactive computing environment 100 are associated with each other and function properly to perform automated analysis of human behavior. The automated analysis of human behavior is performed to predict and identify fraudulent humans from a group of humans in real-time. In an embodiment of the present disclosure, the automated analysis of human behavior is performed to predict and identify fraudulent humans from a mob of humans in real-time.

The interactive computing environment 100 includes the one or more data sources 102. The one or more data sources 102 include at least one of online databases, offline databases, data warehouses, websites, web pages, live CCTV feed and the like. The one or more data sources 102 provide sufficient data to train the fraudulent behavior detection system 110. In an embodiment of the present disclosure, the one or more data sources 102 provide a technical data to the fraudulent behavior detection system 110. The technical data includes but may not be limited to employee data, real-time transaction data, design engineer input, movement calculation of humans, and architecture of the facility 104.

In an example, the technical data includes complete blueprint of a bank or a super market. In another example, the technical data includes layout of different sections of the bank or the super market. In yet another example, the technical data includes input from design engineer that worked on design of the bank or the super market. In yet another example, the technical data includes data of all employee associated with the bank or the super market. In yet another example, the technical data includes transaction data of transactions associated with a customer happening at any super market or bank across the world in real-time.

The interactive computing environment 100 includes the facility 104. The facility 104 includes but may not be limited to at least one of banks, financial institutions, depository institutions, non-depository institutions, malls, and departmental stores. In an embodiment of the present disclosure, the facility 104 is any place or building that requires security from fraudsters. In another embodiment of the present disclosure, the facility 104 is any building that is equipped with CCTV cameras for security purposes. In yet another embodiment of the present disclosure, the facility 104 is any building that needs to be protected from fraudsters. The facility 104 includes the one or more video sources 106. The one or more video sources 106 are installed at the facility 104. In an embodiment of the present disclosure, the one or more video sources 106 are installed inside the facility 104. In another embodiment of the present disclosure, the one or more video sources 106 are installed outside the facility 104. In yet another embodiment of the present disclosure, the one or more video sources 106 are installed all around premises of the facility 104.

The one or more video sources 106 include one or more cameras. The one or more cameras include at least one of infrared cameras, surveillance cameras, CCTV cameras, and the like. The one or more video sources 106 facilitate to provide video data to the fraudulent behavior detection system 110. The one or more video sources 106 provide video data to the fraudulent behavior detection system 110 to train the fraudulent behavior detection system 110. In an embodiment of the present disclosure, the one or more video sources 106 facilitate to provide a live video stream data to the fraudulent behavior detection system 110. The video data includes voice communication between humans, facial expression of humans, body movement pattern of humans, and the like.

The interactive computing environment 100 includes the communication network 108. The communication network 108 provides medium to the one or more data sources 102 to connect to the fraudulent behavior detection system 110. In addition, the communication network 108 provides medium to the one or more video sources 106 to connect to the fraudulent behavior detection system 110. The communication network 108 use protocols to connect the one or more data sources 102 and the one or more video sources 106 to the fraudulent behavior detection system 110. The communication network 108 connects the one or more data sources 102 and the one or more video sources 106 to the fraudulent behavior detection system 110 using a plurality of methods. The plurality of methods used to connect the fraudulent behavior detection system 110 includes but may not be limited to 2G, 3G, 4G, and Wi-Fi. In an embodiment of the present disclosure, the communication network 108 includes but may not be limited local area network (LAN), metropolitan area network (MAN), and wide area network (WAN).

In an embodiment of the present disclosure, the communication network 108 is any type of network that provides internet connectivity to the one or more data sources 102 and the one or more video sources 106. In an embodiment of the present disclosure, the communication network 108 is a wireless mobile network. In another embodiment of the present disclosure, the communication network 108 is a wired network with a finite bandwidth. In yet another embodiment of the present disclosure, the communication network 108 is combination of the wireless and the wired network for optimum throughput of data transmission. In yet another embodiment of the present disclosure, the communication network 108 is an optical fiber high bandwidth network that enables high data rate with negligible connection drops.

The interactive computing environment 100 includes the fraudulent behavior detection system 110. The fraudulent behavior detection system 110 performs automated analysis of human behavior. The fraudulent behavior detection system 110 performs automated analysis of human behavior to determine fraudulent behavior. In an embodiment of the present disclosure, the fraudulent behavior detection system 110 is installed as an application in a computing device. In general, application is any software code that is basically programmed to interact with hardware elements of computing system. The term hardware elements here refers to a plurality of memory types installed inside computing system. Moreover, the application is used to access, read, update and modify data stored in hardware elements of computing system.

The application provides a user interface to interact with hardware elements of the computing device. The user interface may include Graphical User Interface (GUI), Application Programming Interface (API), and the like. The user interface helps to send and receive user commands and data. In addition, the user interface serves to display or return results of operation from the application. In an embodiment of the present disclosure, the user interface is part of the application. In addition, the mobile application installed inside the computing device may be based on any mobile platform. In an example, the mobile platform includes but may not be limited to android, iOS, BlackBerry, Symbian, Windows and Bada. Further, the mobile application installed inside the computing device runs on any version of respective mobile platform of the above mentioned mobile platforms.

In yet another embodiment of the present disclosure, the fraudulent behavior detection system 110 runs as an applet in the computing device. In yet another embodiment of the present disclosure, the fraudulent behavior detection system 110 runs on a web-based interface. In an embodiment of the present disclosure, the fraudulent behavior detection system 110 is accessed through a web browser installed inside the computing device. In yet another embodiment of the present disclosure, the fraudulent behavior detection system 110 is accessed through a widget, API, web applets and the like. In an example, the web-browser includes but may not be limited to Opera, Mozilla Firefox, Google Chrome, Internet Explorer, Microsoft Edge, Safari and UC Browser. Further, the web browser runs on any version of the respective web browser of the above mentioned web browsers.

In an embodiment of the present disclosure, the computing device is a portable computing device. In an example, the portable computing device includes laptop, smartphone, tablet, PDA and the like. In an example, the smartphone may be an Apple smartphone, an Android-based smartphone, a Windows-based smartphone and the like. In another embodiment of the present disclosure, the computing device is a fixed computing device. In an example, the fixed computing device includes a desktop, a workstation PC, a mainframe computer and the like.

The computing device requires a suitable operating system to run. In general, the operating system is system software that manages computer hardware and software resources and provides common services for computer programs. In addition, the operating system acts as an interface for software installed in the computing device to interact with hardware of the computing device. In an embodiment of the present disclosure, the operating system installed in the computing device is a mobile operating system. In an embodiment of the present disclosure, the computing device runs on any suitable operating system designed for portable computing device. In an example, the mobile operating system includes but may not be limited to Windows operating system from Microsoft, Android operating system from Google, iOS operating system from Apple, Symbian based operating system from Nokia, Bada operating system from Samsung Electronics and BlackBerry operating system from BlackBerry. In an embodiment of the present disclosure, the operating system is not limited to the above mentioned operating systems. In addition, the computing device runs on any version of the above mentioned operating systems.

In another embodiment of the present disclosure, the computing device runs on any suitable operating system designed for fixed computing device. In an example, the operating system installed in the computing device is Windows from Microsoft. In another example, the operating system installed in the computing device is Mac from Apple. In yet another example, the operating system installed in the computing device is Linux based operating system. In yet another example, the operating system installed in the computing device may be UNIX, Kali Linux, and the like.

In an embodiment of the present disclosure, the computing device runs on any version of Windows operating system. In another embodiment of the present disclosure, the computing device runs on any version of Mac operating system. In another embodiment of the present disclosure, the computing device runs on any version of Linux operating system. In yet another embodiment of the present disclosure, the computing device runs on any version of the above mentioned operating systems.

In an embodiment of the present disclosure, the computing device is associated with an administrator. In an embodiment of the present disclosure, the administrator is any person who wants to ensure security of the facility 104. In another embodiment of the present disclosure, the administrator is any person who is responsible to ensure that any criminal activity should not happen inside the facility 104. In yet another embodiment of the present disclosure, the administrator is any person who is responsible to completely install and run the fraudulent behavior detection system 110. In yet another embodiment of the present disclosure, the administrator is any person responsible to troubleshoot and maintain the fraudulent behavior detection system 110.

The fraudulent behavior detection system 110 collects the technical data and the video data from the one or more data sources 102 and the one or more video sources 106. The one or more data sources 102 and the one or more video sources 106 are associated with the fraudulent behavior detection system 110. The fraudulent behavior detection system 110 is trained with the collected technical data and the video data. The fraudulent behavior detection system 110 facilitates training in real-time. The fraudulent behavior detection system 110 is trained using one or more hardware-run machine learning algorithms. In addition, the fraudulent behavior detection system 110 is trained using one or more hardware-run deep learning algorithms. In an embodiment of the present disclosure, the fraudulent behavior detection system 110 is trained using neural networks.

In an example, the one or more hardware-run machine learning algorithms and the one or more hardware-run deep learning algorithms include facial recognition algorithms. In another example, the one or more hardware-run machine learning algorithms and the one or more hardware-run deep learning algorithms include pattern recognition algorithms. In yet another example, the one or more hardware-run machine learning algorithms and the one or more hardware-run deep learning algorithms include regression algorithms.

The technical data is collected in one or more input formats. The one or more input formats include at least one of text, audio, video, animation, and gif. In an example, the technical data is collected in form of text documents. In another example, the technical data is collected in form of image files. In yet another example, the technical data is collected in form of audio files. In yet another embodiment, the technical data is collected in form of video files.

The fraudulent behavior detection system 110 receives a live video stream data from the one or more video sources 106. The one or more video sources 106 include one or more cameras. The one or more cameras include at least one of infrared cameras, surveillance cameras, and CCTV cameras, and the like. The live video stream data is received continuously in real-time.

The fraudulent behavior detection system 110 analyzes the live video stream data received from the one or more video sources 106 installed at the facility 104 in real-time. The fraudulent behavior detection system 110 analyzes the live video stream data using the one or more hardware-run machine learning algorithms and the one or more hardware-run deep learning algorithms.

In an embodiment of the present disclosure, the fraudulent behavior detection system 110 uses facial recognition algorithms to analyze the live video stream data. In another embodiment of the present disclosure, the fraudulent behavior detection system 110 uses pattern recognition algorithms to analyze the live video stream data.

The fraudulent behavior detection system 110 maps the live video stream data received from the one or more video sources 106 installed at the facility 104 in real-time. The fraudulent behavior detection system 110 analyzes the live video stream data using the one or more hardware-run machine learning algorithms and the one or more hardware-run deep learning algorithms. The fraudulent behavior detection system 110 scans the live video stream data. The fraudulent behavior detection system 110 scans the live video stream data to divide the live video stream data into one or more frames of images. The fraudulent behavior detection system 110 properly analyzes the frames of images to predict likelihood of fraudulent behavior.

The fraudulent behavior detection system 110 maps moving pattern of humans from the live video stream data to moving pattern of fraudsters in the video data. The fraudulent behavior detection system 110 performs mapping to identify fraudsters from humans in the live video stream data. The mapping is performed based on the one or more hardware-run machine learning algorithms and the one or more hardware-run deep learning algorithms.

The fraudulent behavior detection system 110 predicts likelihood of fraudulent behavior of humans based on analyzation of the live video stream data. The fraudulent behavior detection system 110 performs prediction to alarm concerned authorities of the facility 104 about likelihood of fraudulent behavior. In an example, the fraudulent behavior detection system 110 sends notifications about potential fraud to the concerned authorities based on facial recognition algorithms. In yet another example, the fraudulent behavior detection system 110 sends notification alerts about potential fraud to the concerned authorities based on pattern recognition algorithms.

In an embodiment of the present disclosure, the fraudulent behavior detection system 110 is installed at the server 112. In another embodiment of the present disclosure, the fraudulent behavior detection system 110 is installed at a plurality of servers. In an example, the plurality of servers may include database server, file server, application server and the like. The plurality of servers communicate with each other using the communication network 108. In general, communication network is part of network layer responsible for connection of two or more servers.

Further, the fraudulent behavior detection system 110 is connected with the server 112. In general, server is a computer program that provides service to another computer programs. In general, server may provide various functionalities or services, such as sharing data or resources among multiple clients, performing computation for a client and the like. In an example, the server 112 may be at least one of dedicated server, cloud server, virtual private server and the like. However, the server 112 is not limited to above mentioned servers.

The interactive computing environment 100 includes the database 114. Further, the database 114 is associated with the server 112. In general, database is a collection of information that is organized so that it can be easily accessed, managed and updated. In an example, the database 114 includes at least one of hierarchical database, network database, relational database, object-oriented database and the like. The database 114 provides storage location to the technical data, the video data, the live video stream data, and the like. In an embodiment of the present disclosure, the database 114 provides storage location to all the data and information required by the fraudulent behavior detection system 110. In addition, the database 114 is connected to the server 112. The server 112 stores data in the database 114. The server 112 interacts with the database 114 to retrieve the stored data.

In an example, the fraudulent behavior detection system 110 receives the live video stream data from surveillance cameras installed inside the facility 104. The fraudulent behavior detection system 110 predicts the fraudulent behavior of humans from group of humans. The fraudulent behavior detection system 110 predicts potential fraudster if a person constantly check out arrangement of cameras inside the facility 104. In another example, the fraudulent behavior detection system 110 predicts potential fraudster if a person frequently visits a super market but does not make any transaction. In yet another example, the fraudulent behavior detection system 110 predicts potential fraudster if a person behaves in a weird manner. The fraudulent behavior detection system 110 predicts likelihood of fraud based on movement pattern of person.

The fraudulent behavior detection system 110 may be implemented using the single computing device, or a network of computing devices, including cloud-based computer implementations. The computing device is preferably server class computers including one or more high-performance computer processors and random access memory, and running an operating system such as LINUX or variants thereof. The operations of the fraudulent behavior detection system 110 as described herein can be controlled through either hardware or through computer programs installed in non-transitory computer readable storage devices such as solid state drives or magnetic storage devices and executed by the processors to perform the functions described herein. The database 114 is implemented using non-transitory computer readable storage devices, and suitable database management systems for data access and retrieval. The fraudulent behavior detection system 110 includes other hardware elements necessary for the operations described herein, including network interfaces and protocols, input devices for data entry, and output devices for display, printing, or other presentations of data. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

Figure 2:
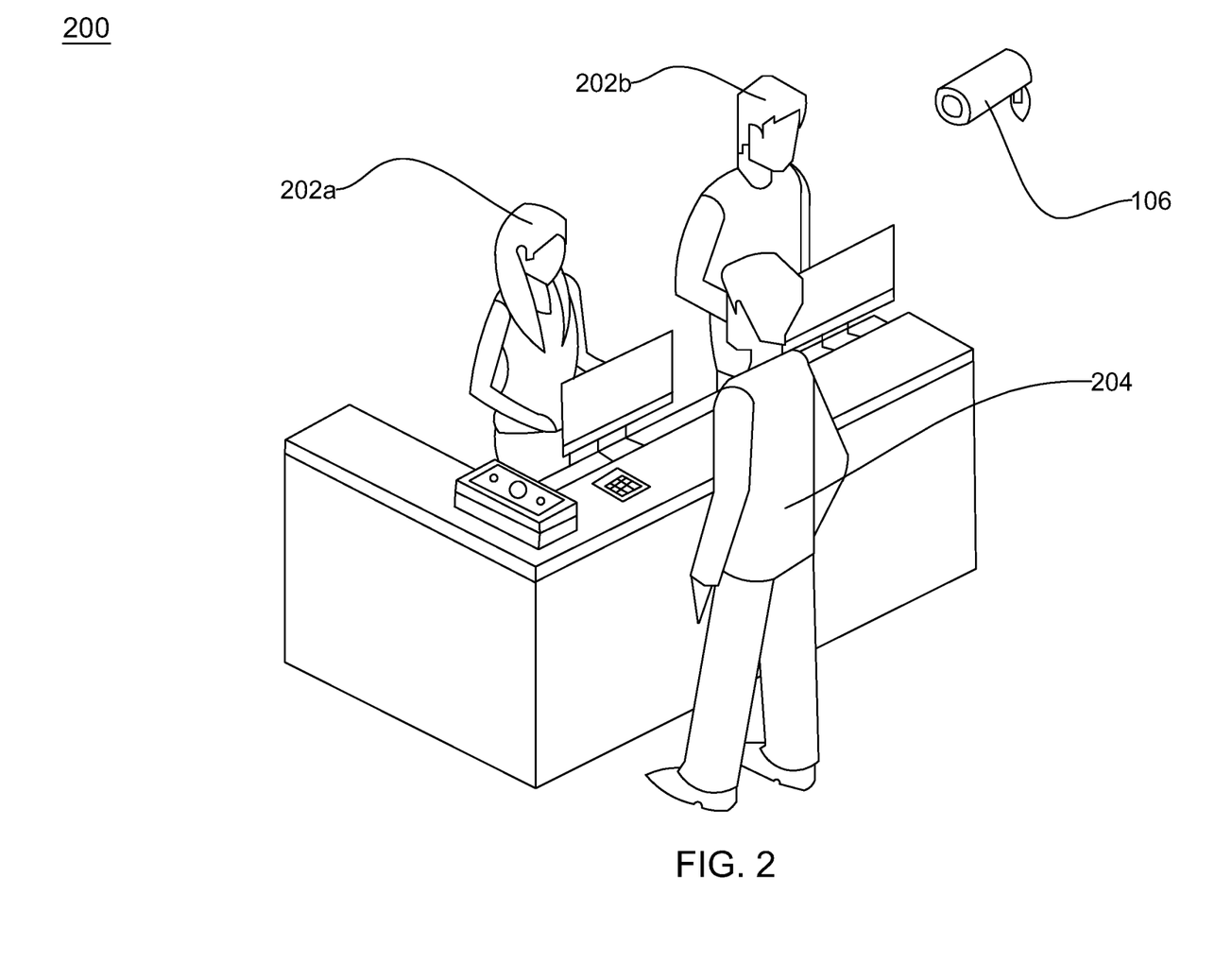
FIG. 2 illustrates an exemplary overview of an internal architecture of a facility, in accordance with various embodiments of the present disclosure.

FIG. 2 illustrates an exemplary overview of an internal architecture of a facility 200, in accordance with various embodiments of the present disclosure. It may be noted that to explain FIG. 2, references will be made to the system elements of FIG. 1.

The facility 200 includes one or more employee 202a-202b, the one or more video sources 106, and a customer 204. The one or more employee 202a-202b includes a first employee 202a and a second employee 202b. The one or more video sources 106 are installed inside the facility 200. The one or more video sources 106 provide the live video stream data to the fraudulent behavior detection system 110. The fraudulent behavior detection system 110 analyzes the live video stream data in real-time to predict for potential fraudsters. In an example, the customer 204 is a potential fraudster and wants to commit fraud inside the facility 200. The fraudulent behavior detection system 110 predicts likelihood of potential fraud to be done by the customer 204 based on various facial recognition algorithms and pattern recognition algorithms. In addition, the fraudulent behavior detection system 110 access historical data of moving pattern of humans and map historical data with live data of moving pattern of humans. Further, the fraudulent behavior detection system 110 predicts likelihood of potential fraud to be done by the customer 204 based on analysis of live moving pattern of humans with historical moving pattern of humans stored in the fraudulent behavior detection system 110. In another example, the first employee 202a is a potential fraudster and plans to commit transaction fraud. The fraudulent behavior detection system 110 predicts likelihood of potential fraud to be done by the first employee 202a based on historical data of patterns stored in the fraudulent behavior detection system 110. In addition, the fraudulent behavior detection system 110 predicts likelihood of potential fraud to be done by the first employee 202a based on various facial recognition algorithms and pattern recognition algorithms.

Figure 3:
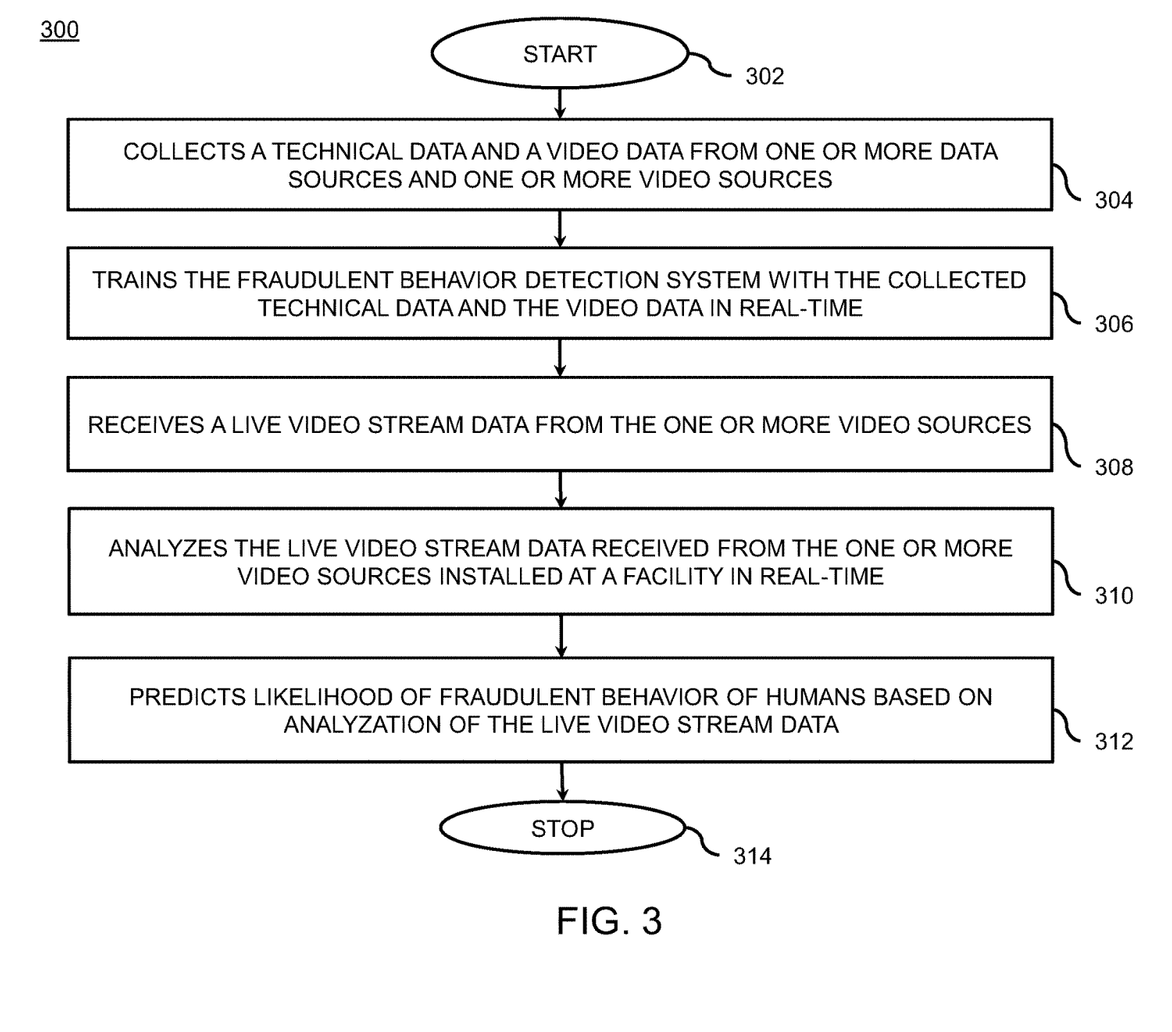
FIG. 3 illustrates a flow chart for automated analysis of human behavior, in accordance with various embodiments of the present disclosure.

FIG. 3 illustrates a flow chart 300 for automated analysis of human behavior, in accordance with various embodiments of the present disclosure. It may be noted that to explain the process steps of flowchart 300, references will be made to the system elements of FIG. 1. It may also be noted that the flowchart 300 may have lesser or more number of steps.

The flowchart 300 initiates at step 302. Following step 302, at step 304, the fraudulent behavior detection system 110 collects the technical data and the video data from the one or more data sources 102 and the one or more video sources 106. At step 306, the fraudulent behavior detection system 110 trains the fraudulent behavior detection system 110 with the collected technical data and the video data in real-time. At step 308, the fraudulent behavior detection system 110 receives the live video stream data from the one or more video sources 106. At step 310, the fraudulent behavior detection system 110 analyzes the live video stream data received from the one or more video sources 106 installed at the facility 104 in real-time. At step 312, the fraudulent behavior detection system 110 predicts likelihood of fraudulent behavior of humans based on analyzation of the live video stream data. The flow chart 300 terminates at step 314.

Figure 4:
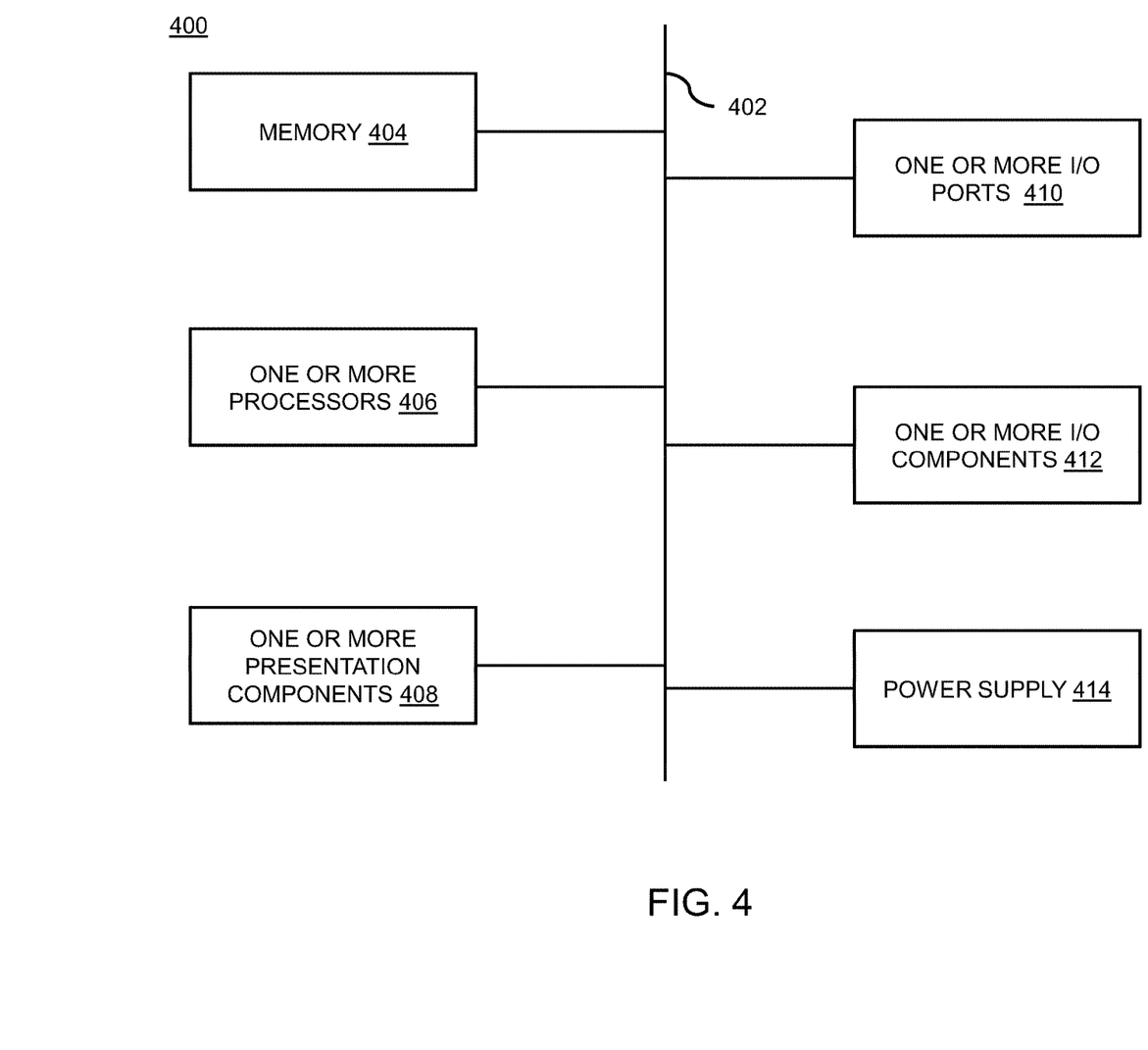
FIG. 4 illustrates a block diagram of a computing device, in accordance with various embodiments of the present disclosure.

FIG. 4 illustrates a block diagram of the computing device 400, in accordance with various embodiments of the present disclosure. The computing device 400 is a non-transitory computer-readable storage medium. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes the one or more processors 406 that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for automated analysis of human behavior, wherein the automated analysis of human behavior is performed for determining fraudulent behavior of one or more users, the computer-implemented method comprising:
    collecting, with a fraudulent behavior detection system that includes a processor, a technical data and a video data from one or more data sources and one or more video sources, wherein the one or more data sources and the one or more video sources are associated with the fraudulent behavior detection system;
    training, with the fraudulent behavior detection system that includes the processor, the fraudulent behavior detection system with the collected technical data and the video data in real-time, wherein the fraudulent behavior detection system facilitates training in real-time, wherein the training of the fraudulent behavior detection system is performed using one or more hardware-run machine learning algorithms and one or more hardware-run deep learning algorithms;
    receiving, with the fraudulent behavior detection system that includes the processor, a live video stream data from the one or more video sources, wherein the live video stream data is received continuously in real-time, wherein the one or more video sources are installed at a facility;
    analyzing, with the fraudulent behavior detection system that includes the processor, the live video stream data received from the one or more video sources installed at the facility in real-time, wherein the live video stream data is analyzed using the one or more hardware-run machine learning algorithms and the one or more hardware-run deep learning algorithms;
    predicting, with the fraudulent behavior detection system that includes the processor, likelihood of the fraudulent behavior of humans based on the analysis of the live video stream data, wherein the prediction is performed for alarming concerned authorities of the facility about likelihood of fraudulent behavior;
    scanning, with the fraudulent behavior detection system that includes the processor, the live video stream data, wherein the scanning of the live video stream data is performed for dividing the live video stream data into one or more frames of images, wherein the frames of images are analyzed for predicting the likelihood of the fraudulent behavior; and
    mapping, with the fraudulent behavior detection system that includes the processor, moving pattern of humans from the live video stream data to moving pattern of fraudsters in the video data stored in a database, wherein the mapping is performed to identify fraudsters from humans in the live video stream data.

2. The computer-implemented method as recited in claim 1, wherein the technical data comprises employee data, real-time transaction data, design engineer input, movement calculation of human, and architecture of the facility.

3. The computer-implemented method as recited in claim 1, wherein the video data comprises voice communication between humans, facial expression of humans, and body movement pattern of humans.

4. The computer-implemented method as recited in claim 1, wherein the one or more data sources comprises at least one of online databases, offline databases, data warehouses, websites, web pages and live CCTV feed.

5. The computer-implemented method as recited in claim 1, wherein the one or more video sources comprises one or more cameras, wherein the one or more cameras comprises at least one of infrared cameras, surveillance cameras, and CCTV cameras.

6. The computer-implemented method as recited in claim 1, wherein the facility comprises at least one of banks, financial institutions, depository institutions, non-depository institutions, malls, and departmental stores.

7. The computer-implemented method as recited in claim 1, wherein the technical data is collected in one or more input formats, wherein the one or more formats comprises at least one of text, audio, video, animation, and gif.

8. A computer system comprising:
    one or more processors; and
    a memory coupled to the one or more processors, the memory for storing instructions which, when executed by the one or more processors, cause the one or more processors to perform a method for automated analysis of human behavior, wherein the automated analysis of human behavior is performed for determining fraudulent behavior, the method comprising:
        collecting, at a fraudulent behavior detection system, a technical data and a video data from one or more data sources and one or more video sources, wherein the one or more data sources and the one or more video sources are associated with the fraudulent behavior detection system;
        training, at the fraudulent behavior detection system, the fraudulent behavior detection system with the collected technical data and the video data in real-time, wherein the fraudulent behavior detection system facilitates training in real-time, wherein the training of the fraudulent behavior detection system is performed using one or more hardware-run machine learning algorithms and one or more hardware-run deep learning algorithms;
        receiving, at the fraudulent behavior detection system, a live video stream data from the one or more video sources, wherein the live video stream data is received continuously in real-time, wherein the one or more video sources are installed at a facility;

analyzing, at the fraudulent behavior detection system, the live video stream data received from the one or more video sources installed at the facility in real-time, wherein the live video stream data is analyzed using the one or more hardware-run machine learning algorithms and the one or more hardware-run deep learning algorithms;

predicting, at the fraudulent behavior detection system, likelihood of fraudulent behavior of humans based on the analysis of the live video stream data, wherein the prediction is performed for alarming concerned authorities of the facility about the likelihood of the fraudulent behavior;

scanning, with the fraudulent behavior detection system that includes the processor, the live video stream data, wherein the scanning of the live video stream data is performed for dividing the live video stream data into one or more frames of images, wherein the frames of images are analyzed for predicting the likelihood of the fraudulent behavior; and mapping, with the fraudulent behavior detection system that includes the processor, moving pattern of humans from the live video stream data to moving pattern of fraudsters in the video data stored in a database, wherein the mapping is performed to identify fraudsters from humans in the live video stream data.

9. The computer system as recited in claim 8, wherein the technical data comprises employee data, real-time transaction data, design engineer input, movement calculation of human, and architecture of the facility.

10. The computer system as recited in claim 8, wherein the video data comprises voice communication between humans, facial expression of humans, and body movement pattern of humans.

11. The computer system as recited in claim 8, wherein the one or more video sources comprises one or more cameras, wherein the one or more cameras comprises at least one of infrared cameras, surveillance cameras, and CCTV cameras.

12. The computer system as recited in claim 8, wherein the facility comprises at least one of banks, financial institutions, depository institutions, non-depository institutions, malls, and departmental stores.

13. A non-transitory computer-readable storage medium encoding computer executable instructions that, when executed by at least one processor, performs a method for automated analysis of human behavior, wherein the automated analysis of human behavior is performed for determining fraudulent behavior, the method comprising:

collecting, at a computing device, a technical data and a video data from one or more data sources and one or more video sources, wherein the one or more data sources and the one or more video sources are associated with a fraudulent behavior detection system;

training, at the computing device, the fraudulent behavior detection system with the collected technical data and the video data in real-time, wherein the fraudulent behavior detection system facilitates training in real-time, wherein the training of the fraudulent behavior detection system is performed using one or more hardware-run machine learning algorithms and one or more hardware-run deep learning algorithms;

receiving, at the computing device, a live video stream data from the one or more video sources, wherein the live video stream data is received continuously in real-time, wherein the one or more video sources are installed at a facility;

analyzing, at the computing device, the live video stream data received from the one or more video sources installed at the facility in real-time, wherein the live video stream data is analyzed using the one or more hardware-run machine learning algorithms and the one or more hardware-run deep learning algorithms;

predicting, at the computing device, likelihood of fraudulent behavior of humans based on analysis of the live video stream data, wherein the prediction is performed for alarming concerned authorities of the facility about the likelihood of the fraudulent behavior;

scanning, with the fraudulent behavior detection system that includes the processor, the live video stream data, wherein the scanning of the live video stream data is performed for dividing the live video stream data into one or more frames of images, wherein the frames of images are analyzed for predicting the likelihood of the fraudulent behavior; and mapping, with the fraudulent behavior detection system that includes the processor, moving pattern of humans from the live video stream data to moving pattern of fraudsters in the video data stored in a database, wherein the mapping is performed to identify fraudsters from humans in the live video stream data.

14. The non-transitory computer-readable storage medium as recited in claim 13, wherein the one or more video sources comprises one or more cameras, wherein the one or more cameras comprises at least one of infrared cameras, surveillance cameras, and CCTV cameras.

* * * * *